United States Patent
Masse et al.

(10) Patent No.: US 10,637,599 B1
(45) Date of Patent: Apr. 28, 2020

(54) PROACTIVE AND REACTIVE AUTOMATED FAULT IDENTIFICATION AND ISOLATION IN AN OPTICAL TRANSPORT NETWORK, AND APPLICATIONS THEREOF

(71) Applicant: LightRiver Technologies, Inc., Concord, CA (US)

(72) Inventors: Timothy Wayne Masse, Spring Hill, TN (US); John Lynn Cooper, Smyrna, TN (US); Travis Duane Ewert, Highland Ranch, CO (US); Francis Santitoro, Freehold, NJ (US); Michael Leddy, Princeton, NJ (US); James Faraci, Avon by the Sea, NJ (US)

(73) Assignee: LIGHTRIVER TECHNOLOGIES, INC., Concord, CA (US)

( * ) Notice: Subject to any disclaimer, the term of this patent is extended or adjusted under 35 U.S.C. 154(b) by 0 days.

(21) Appl. No.: 16/707,734

(22) Filed: Dec. 9, 2019

(51) Int. Cl.
*H04J 3/16* (2006.01)
*H04L 1/00* (2006.01)
*H04J 14/02* (2006.01)

(52) U.S. Cl.
CPC ........ *H04J 3/1652* (2013.01); *H04J 14/0294* (2013.01); *H04L 1/0072* (2013.01)

(58) Field of Classification Search
CPC .... H04J 3/1652; H04J 14/0294; H04L 1/0072
USPC .......................................................... 398/25
See application file for complete search history.

(56) References Cited

U.S. PATENT DOCUMENTS

| | | | | |
|---|---|---|---|---|
| 6,718,384 B2* | 4/2004 | Linzy | ............... | H04L 41/0213 709/220 |
| 7,155,123 B2* | 12/2006 | Levy | ............... | H04B 10/07 398/33 |
| 2003/0204595 A1* | 10/2003 | Lev | ............... | H04L 41/06 709/226 |
| 2009/0010643 A1* | 1/2009 | DeLew | ............... | H04B 10/035 398/17 |
| 2013/0129345 A1* | 5/2013 | Meng | ............... | H04J 3/0682 398/25 |
| 2019/0215073 A1* | 7/2019 | Schmogrow | ..... | H04B 10/07953 |
| 2019/0261072 A1* | 8/2019 | Fonseca | ............... | H04B 10/073 |

* cited by examiner

Primary Examiner — Dalzid E Singh
(74) Attorney, Agent, or Firm — Sterne, Kessler, Goldstein and Fox P.L.L.C.

(57) ABSTRACT

Embodiments providing improved systems and methods deploying, monitoring, and troubleshooting optical physical layer networks are needed. A baseline may be created and performance data is extracted. The performance data is compared against user-defined rules to determine an appropriate action. In one embodiment, networks are first constructed in a specialized network factory, where they are racked, provisioned, audited, and tested by relevant experts in each technology. In another embodiment, a method isolates a problem in an optical transport network. When a problem is identified, the layers are repeatedly evaluated to identify the device operating at the lowest layer where an error occurs. That device is identified as being likely faulty.

19 Claims, 12 Drawing Sheets

FIG. 9

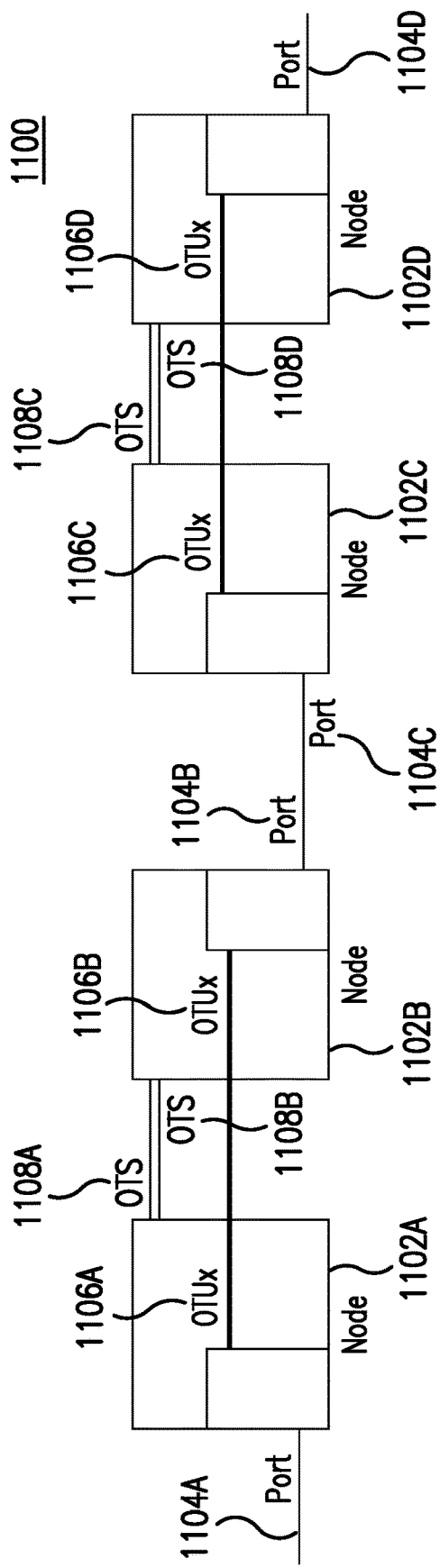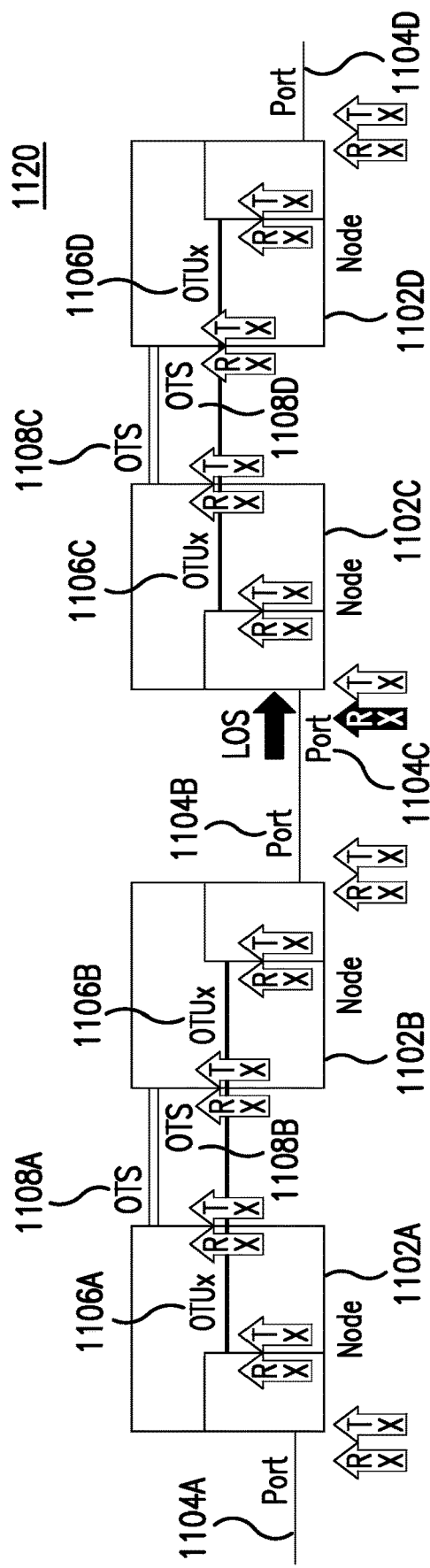

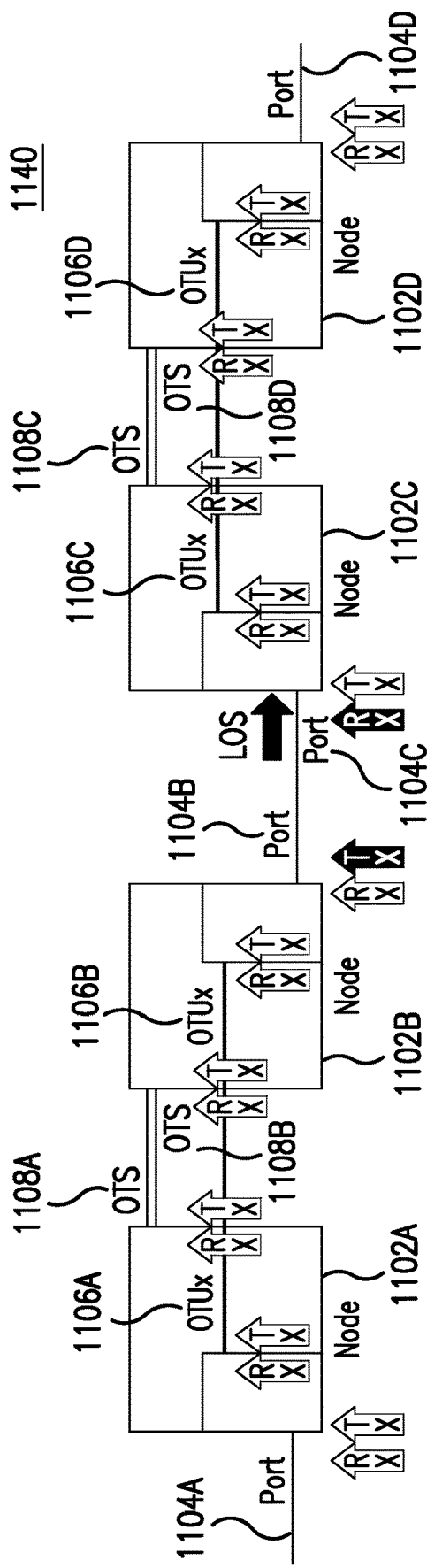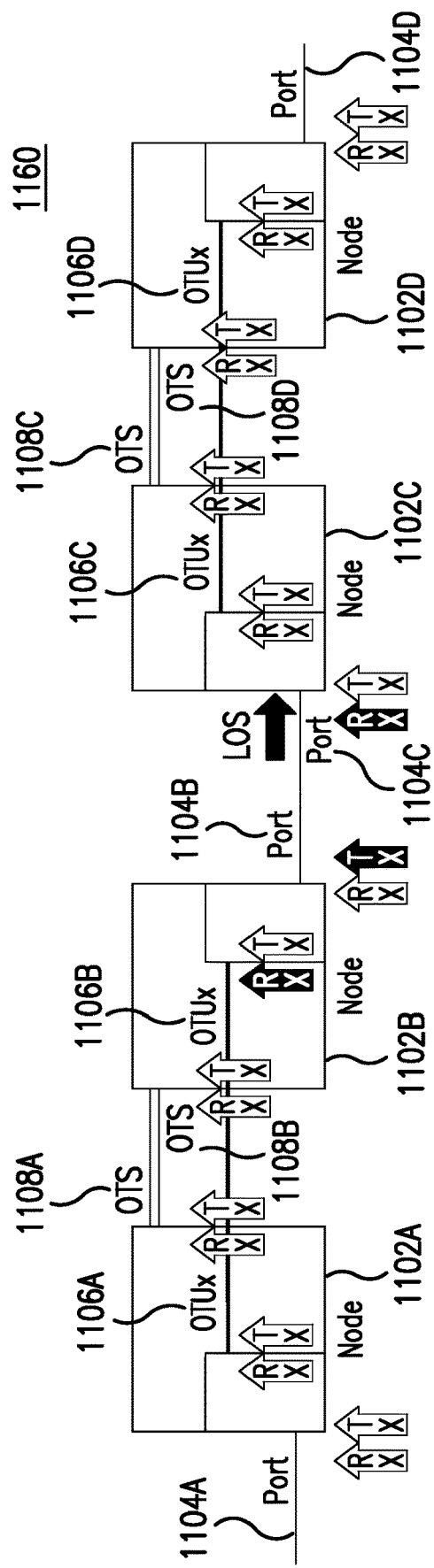
FIG. 11B
FIG. 11C

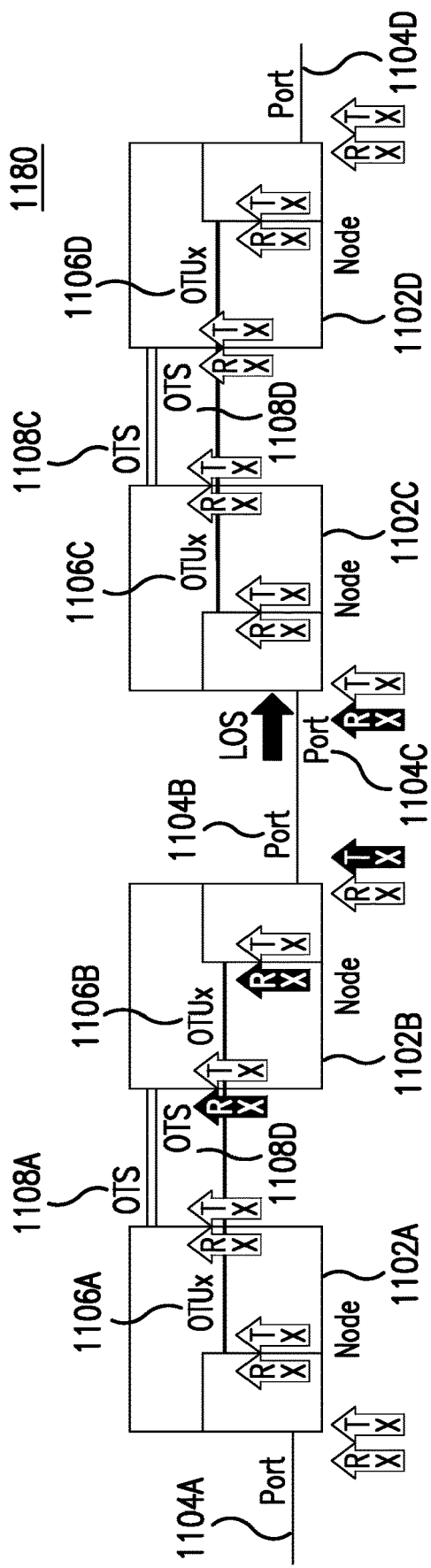
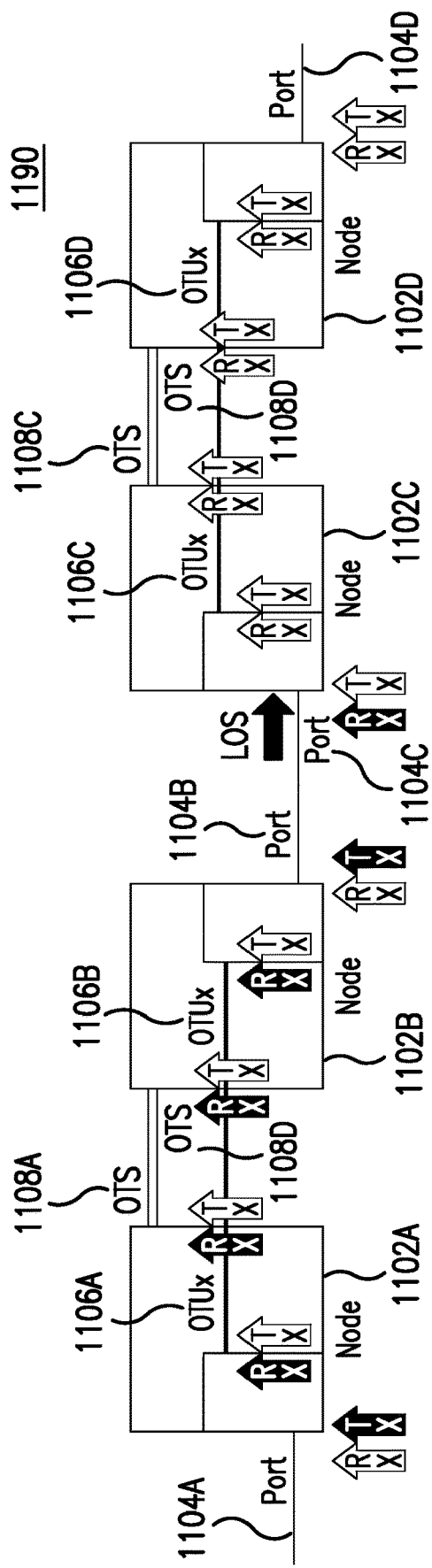
FIG. 11D
FIG. 11E

PROACTIVE AND REACTIVE AUTOMATED FAULT IDENTIFICATION AND ISOLATION IN AN OPTICAL TRANSPORT NETWORK, AND APPLICATIONS THEREOF

FIELD OF THE INVENTION

This application generally relates to optical transport networks.

BACKGROUND

Optical transport networking (OTN) is an industry standard for efficient transmission of data over different light paths. OTN operates primarily at the OSI physical layer. It provides a mechanism for circuits to be multiplexed at different wavelengths of light. The data can be any type of network traffic including multimedia services, mobile applications, social media, VoIP, and cloud computing.

To transmit data, an optical transport network includes a set of Optical Network Elements (ONE) connected by optical fiber links, able to provide functionality of transport, multiplexing, switching, management, supervision and survivability of optical channels carrying client signals. Each ONE may re-time, re-amplify, or re-shape photonic light signals from the optical fiber links.

OTN wraps payloads from various clients into a container for transport across optical networks, preserving the clients' native structure, timing information, and management information. The enhanced multiplexing capability of OTN allows different traffic types—including Ethernet, storage, and digital video, as well as SONET/SDH—to be carried over a single Optical Transport Unit frame. These OTN networks comprise both backbone transmission and can extend into data centers and directly to homes and businesses. Data centers are facilities where the equipment is located and can include Central Offices.

Because of increasing demand for network services, bandwidth requirements for transport networks have been increasing. Accordingly, cloud service providers, content providers, and traditional competitive communications service providers are demanding that new networks, such as networks at their data centers and between data centers, be implemented more quickly. Moreover, equipment manufacturers are developing new higher bandwidth products more quickly. This means OTN network operators products are replacing existing ONEs more quickly.

Installing a new network traditionally involves assembling the fibers and optical network elements on-site, perhaps at a data center. The traditional process for deploying a new transport network has long project timelines, taking as long as 12 months, and draws heavily upon scarce internal optical engineering resources. The resulting network also may have inconsistent quality, because the fibers may not be of ideal length and the assembly may not take place in a clean room environment resulting in particulates interfering with light levels.

Monitoring optical transport networks tends to be reactive in nature. Only when a loss of data or noticeable decrease in bandwidth is detected does an operator dig in to try to diagnose a problem. For example, optical transport networks may fail when a kink or break occurs in the fiber, or when an ONE fails. When a problem does occur, tracking down and isolating the source of the problem can be a long and labor-intensive process involving a human operator testing many pieces of equipment individually.

Improved methods for deploying, proactively and reactively monitoring, and troubleshooting optical physical layer networks are needed.

BRIEF SUMMARY

Embodiments relate to improved optical physical-layer networks. A computer implemented method is provided for locating a fault in an optical transport network. In the method, a plurality of network elements are retrieved, from an inventory database, in the optical transport network corresponding to a network service. Each of the plurality of network elements corresponds to a layer in a network hierarchy of the plurality of network elements. Runtime performance information is retrieved for each of the plurality of network elements. Then it is determined which network elements from the plurality of network elements report an error in the retrieved performance information. Finally, a network element at a lowest layer in the network hierarchy that is reporting a problem is identified. Finally, the network element identified is output as being possibly faulty.

Further embodiments, features, and advantages of the invention, as well as the structure and operation of the various embodiments, are described in detail below with reference to accompanying drawings.

BRIEF DESCRIPTION OF THE DRAWINGS

The accompanying drawings are incorporated herein and form a part of the specification.

FIG. 9 shows an interface for reviewing diagnostics of a network service in an optical transport network, according to an embodiment.

FIG. 11 shows an example of an optical transport network, according to an embodiment.

FIGS. 11A-E illustrate an example of a optical transport network, according to an embodiment.

In the drawings, like reference numbers generally indicate identical or similar elements. Additionally, generally, the left-most digit(s) of a reference number identifies the drawing in which the reference number first appears.

DETAILED DESCRIPTION

Embodiments providing improved systems and methods deploying, monitoring, and troubleshooting optical physical layer networks are needed. In one embodiment, networks are first constructed in a specialized network factory, where they are racked, provisioned, audited, and tested by relevant experts in each technology. Then the equipment is custom-crated—with all cards, patch cords, labels, and provisioning in place—before being shipped to field locations. A production network health baseline is captured that creates a set of norms that later performance data can be compared against. Once the network is operational, the network health is monitored and compared against the baseline. If there's a deviation sufficient to satisfy a user-defined rule, a remedial action can be triggered.

Embodiments provide various methods to isolate a problem in an optical transport network. Though operating primarily at the OSI physical layer, the optical transport network has various sublayers that allow it to encapsulate and transmit data from multiple network services in a single pulse of light. When a problem is identified, the layers are repeatedly evaluated to identify the device operating at the lowest layer where an error occurs. That device is identified as being likely faulty.

These and other embodiments are described with respect to the figures below.

Figure 1:
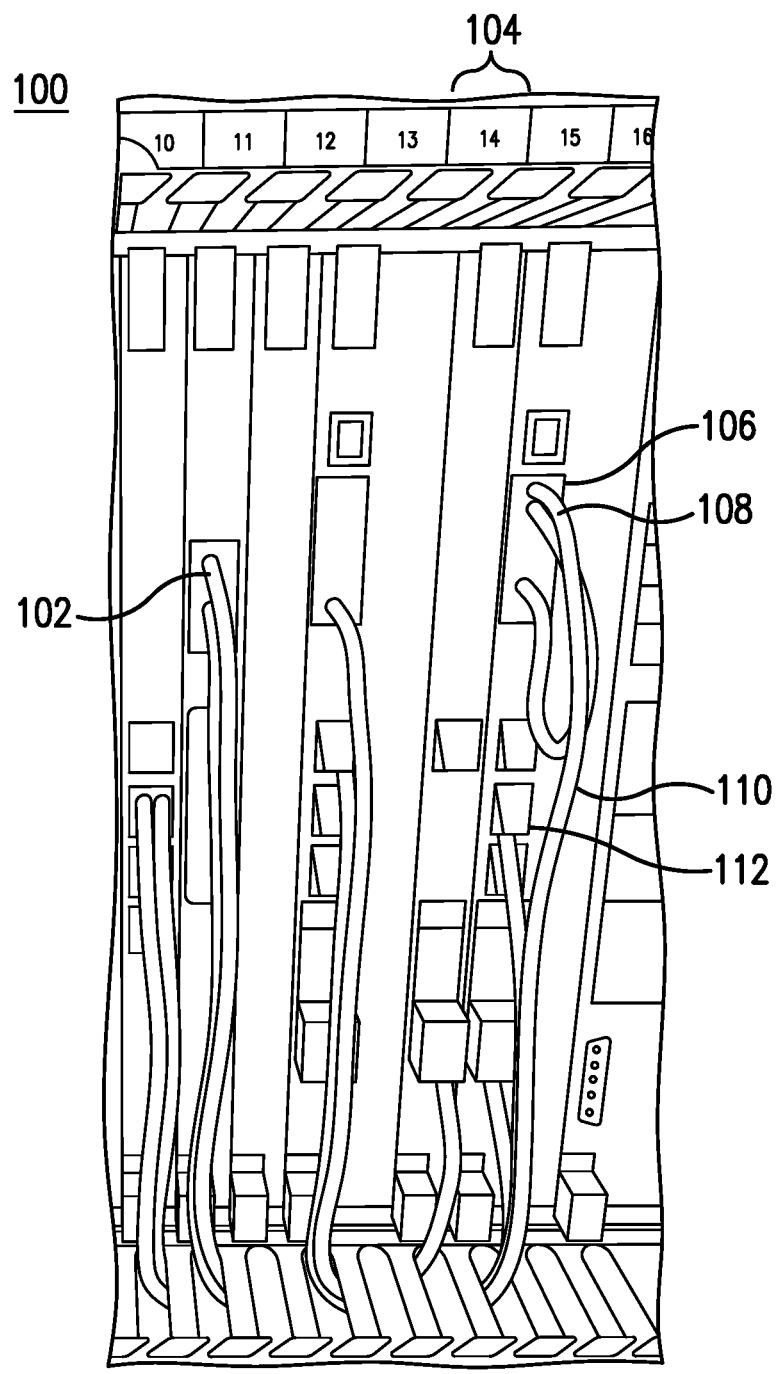
FIG. 1 is a diagram of a factory built optical transport network, according to an embodiment.

FIG. 1 is a diagram of an optical transport network apparatus 100, according to an embodiment. Optical transport network apparatus 100 includes a plurality of optical network elements, such as optical network element 104. Each optical network element 104 can be from a different vendor and can have one or more optical interfaces, such as optical interfaces 102 and 106. Connected to the optical interfaces 102 and 106 are optical fibers, such as optical fibers 108 and 110. Each of these components are discussed below.

The plurality of optical network elements may each be inserted into a slot of the optical transport network apparatus 100. The plurality of optical network elements can include an optical add/drop multiplexer, optical network interface cards, optical amplifiers, or optical switches. While aspects of this disclosure are shown for optical transport networks, a skilled artisan would recognize they can be applied to other types of transport networks and physical-layer transport networks.

An optical add-drop multiplexer (OADM) is a device used in wavelength-division multiplexing systems for multiplexing and routing different channels of light into or out of a single mode fiber (SMF). "Add" and "drop" here refer to the capability of the device to add one or more new wavelength channels to an existing multi-wavelength WDM signal, and/or to drop (remove) one or more channels, passing those signals to another network path. An OADM may be considered to be a type of optical cross-connect.

An optical network interface card may convert electrical signals into optical signals or may convert optical signals of other protocols into an optical transport network protocol. They may interact with user premises devices. It may take user data and wrap it with an OTN header and forward error correction information. An example of an optical network interface cards includes an optical supervisory channel module.

An optical amplifier is a device that amplifies an optical signal, perhaps directly, without the need to first convert it to an electrical signal. These devices are used to compensate optical signal attenuation caused by fibers and components, to increase optical transmission distance. An example may be an Erbium-Doped Fiber Amplifier.

As described above, the plurality of optical network elements are connected with optical fibers. Within a data center, the optical fibers may be patch cords. An optical fiber is a flexible, transparent fiber made by drawing glass (silica) or plastic to a narrow diameter. Optical fibers are used most often as a means to transmit light between the two ends of the fiber.

Optical transport network apparatus 100 may be constructed in a specialized network factory, where they are racked, provisioned, audited, and tested by relevant experts in each technology. The patch cords, that is the fibers necessary to connect different pieces of equipment within optical transport network apparatus 100 and to other optical equipment on-site at the data center, are measured and cut to a custom length corresponding to the distance between the interfaces and slots. This may occur while optical transport network apparatus 100 is being constructed at the specialized network factory and before the optical transport network apparatus 100 is shipped to the customer data center. Before being shipped to field locations, optical transport network apparatus 100 is custom-crated—with all cards, patch cords, labels, and provisioning in place as illustrated in FIGS. 2 and 3.

Figure 2:
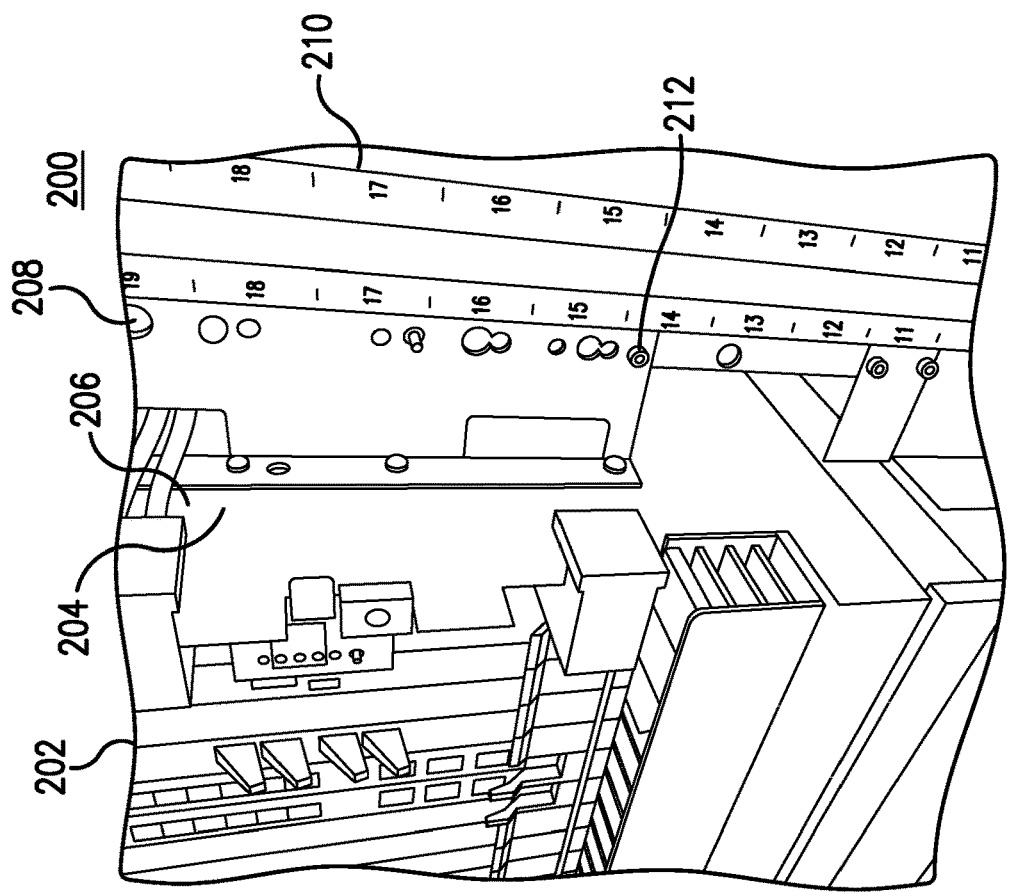
FIG. 2 shows a chassis for a factory built optical transport network, according to an embodiment.

FIG. 2 shows a diagram 200 that illustrates a custom-designed bracket that connects two or more optical fiber networking chassis together, while maintaining fiber patch cords in place.

Diagram 200 illustrates an optical network chassis 202. Chassis 202 can carry one or more optical network elements. Patch cords run off the optical network elements such as patch cords 204 and 206. Chassis 202 is a chassis for a factory built optical transport network, according to embodiment. Chassis 202 is connected to a bracket 208. Bracket 208 is adapted to affix to a plurality of fiber networking chassis together so fiber patch cords that run between the two chassis can remain in place during shipment and field installation.

Figure 3:
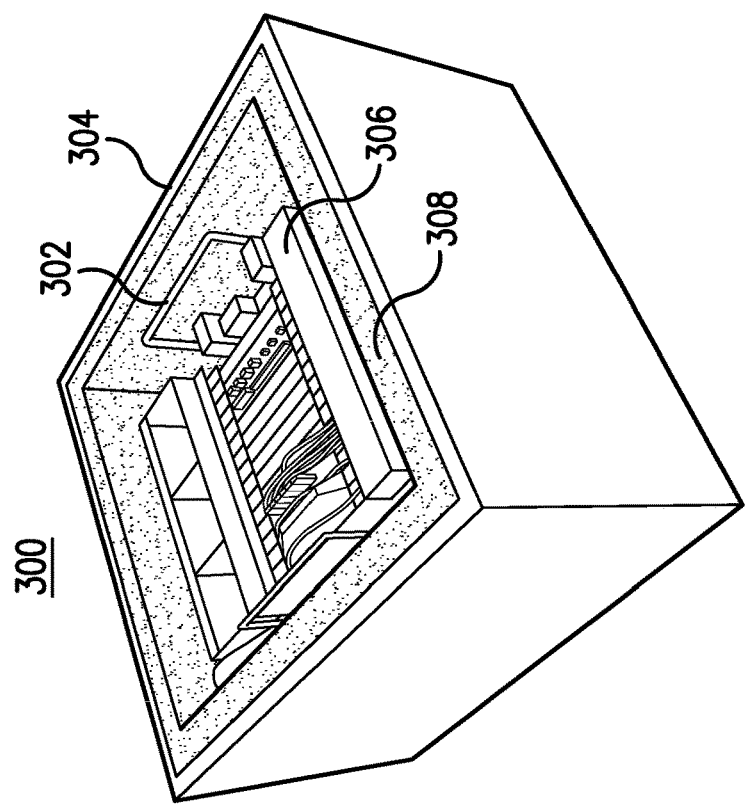
FIG. 3 shows packaging for a factory built optical transport network, according to an embodiment.

FIG. 3 shows a diagram 300 that illustrates packaging for a factory built optical transport network, according to an embodiment.

Diagram 300 illustrates a crate 304 used for shipping a factory-built optical network. Crate 304 has a cushion 308 that protects a chassis 306 that has circuit pack cards installed in the factory. Cushion 308 also provides space and protection for pre-run fiber patch cords. Crate 304 has sides that detach with clips to allow for packing, unpacking, and collapsing of crate 304 into a flat pack for more efficient and cost effective return shipping. To remove chassis 306 from crate 304, custom-built handles 302 allow a user to grasp chassis 306 without interfering with any of the pre-installed patch cords.

Figure 4:
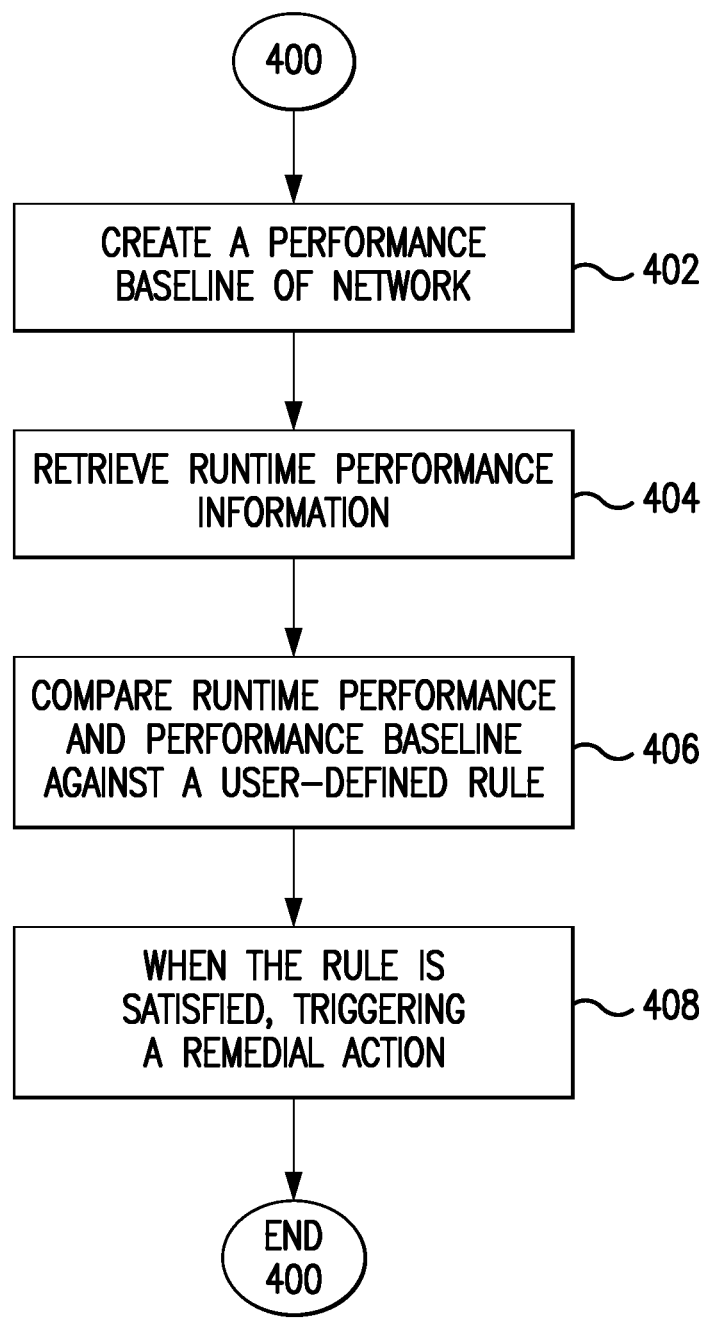
FIG. 4 illustrates a method for proactively or reactively isolating a physical trouble in a network, according to an embodiment.

FIG. 4 illustrates a method 400 for monitoring performance of a network, such as a factory built network, according to an embodiment.

Method 400 begins at step 402, by creating a performance baseline representing a performance of an optical transport network apparatus when the optical transport network apparatus is being setup. Creating the performance baseline may involve first determining an inventory, that is, a complete database of all the circuits, connections, ports, and cards on the optical transport network. To create the performance baseline, a controller, as will be described further with respect to FIG. 5, may log into each optical network element and discover each card, each port, each circuit, how each port is wired to one another, from node to node (ONE to ONE). For example, the controller may discover that port one of node one will go to port two of node two and so on.

To communicate with the optical network elements, different command sets may be used depending on a type of the network element. The different command sets may be implemented in different resource adapters. Each resource adapter is configured to implement the desire functionality of the controller in one of various network command languages. The network command languages include, but are not limited to, Transaction Language 1 (TL1), Simple Network Management Protocol (SNMP), command-line interface (CLI), and NETCONF/YANG.

After determining all the connections in the OTN, the controller may discover performance characteristics of the independent connections. In the factory environment and/or in the customer's data center, the OTN can undergo a trial period, perhaps for a week of "burn-in", to ensure successful functioning. During the trial period, test data may be transported over the network and performance data may be collected from the various optical network elements. In the factory, light levels, bit error rate (BER), throughput, latency, errored seconds, severely errorred seconds, unavailable second, number of coding violations (errors), forward error corrections, uncorrectable block errors, and/or jitter testing can be completed efficiently with test systems geared towards testing multiple circuits simultaneously. The light levels may be measured as span loss decibels. The resource adapters described above can be used to collect the performance data from different types of ONEs. Together, the initial performance data on setup may constitute a performance baseline of the optical network.

Additionally or alternatively, the performance baseline of the optical network may be created by calculating the performance baseline based on the length of the patch cords and the locations corresponding to the plurality of optical network elements. From this calculation, a performance baseline may be created without a need to conduct a test.

At step 404, performance information of the plurality of optical elements is collected during runtime at various time periods. The runtime performance information can include light levels, bit error rate (BER), throughput, latency, and/or jitter for each port and each connection in the optical transport network. To collect the runtime performance information, the controller may communicate with each of the optical network elements. The controller may communicate with the ONEs using the resource adapters described above. The performance data may be collected intermittently or periodically, such as daily, hourly, weekly, or in real-time. ONEs may provide periodic heartbeats to indicate their availability. They can provide capacity information both physically and on the line or logically within a particular service, such as a particular VLAN, Ethernet circuit, or other service provided to a customer.

At step 406, the runtime performance information is compared against the performance baseline against a user-defined rule. The user-defined rule may be a rule specified by the customer indicating an acceptable degree of variation from the performance baseline. For example, a customer may specify that it would accept one standard deviation, given daily variance levels, of a particular performance characteristic from the performance baseline. In another example, the customer may specify the user-defined rule with respect to operating ranges of the ONEs as defined by the equipment manufacturers. For example, a customer may set a rule to trigger an action when the runtime light levels are within 60% of the equipment manufacturers' tolerances for the device. For example, a customer may set a rule to trigger an action based on a rate of change in the collected performance information.

In another embodiment, the user-defined rule may involve machine learning techniques. For example, a machine learning technique may predict when a network health issue, such as exhaustion available capacity, may occur. In various examples, one of the following machine learning techniques may be applied to the runtime and baseline performance information collected from the ONEs:

SPC—traditional statistical process control with everything exceeding 3 standard deviations being called "an outlier" or anomaly.

Clustering—unsupervised machine learning approach where all the data points are analyzed by their proximity to the center of mass for the entire population. Those rare points that are the farthest from the center are called "anomalous".

Isolation Forest—supervised machine learning techniques based on building hundreds of randomized decision trees and aggregating their predictions into one. Those "decision splits" that belong to the shortest tree branches are considered "anomalous".

Ensemble approach—combination of the above and other techniques into one "ensemble" of models where they all vote on the same data and the majority of decisions counts.

Signal correlation-based approach—where one first establishes multiple paired correlations between all the signals and then observes those instances when some of these correlations go away. These moments are considered "anomalous".

Linear Regression—allows you to look at a variable (univariate) or set of variables (multivariate linear regression) to identify outliers—the classic clustering of data along a line (or plane) of data. A similar approach may be used to identify failing drives. Based on drive type, load, and read/write split, one may expect i/o (the single output variable) to perform within a set 'healthy' range. If outside of that, there may be an issue. There are countless scenarios where this could be useful to identify KPIs starting to move into dangerous territory.

CART—creates a decision tree that can be useful for classifications or predictions. A Classification Tree would be useful in creating 'smart alerts'. The tree is effectively a decision chain (is service up? Is KPIa>x? Is interconnect congested?, etc) to help guide ops or automation. There is a Regression Tree version that produces a numeric output (application memory required) through similar means.

Naive Bayes—a forecasting/predictive modeling tool that can calculate the probability of an event (component failure, customer augment/disco, etc.) If the component probabilities are tuned over time, one could create a powerful tool. If one develops an understanding of the weighting of the independent variables in the predictive model (i.e. from our old world, what are the factors that create a major shedding event), one can develop simple thresholds for non-obvious components to a critical failure.

In this way, by capturing a performance baseline at step 402, a controller has captured characteristics of a known good state for the OTN. It means that the controller at step 404 can diagnose conditions and track changes before an issue gets outside of tolerances allowed for devices.

Figure 7:
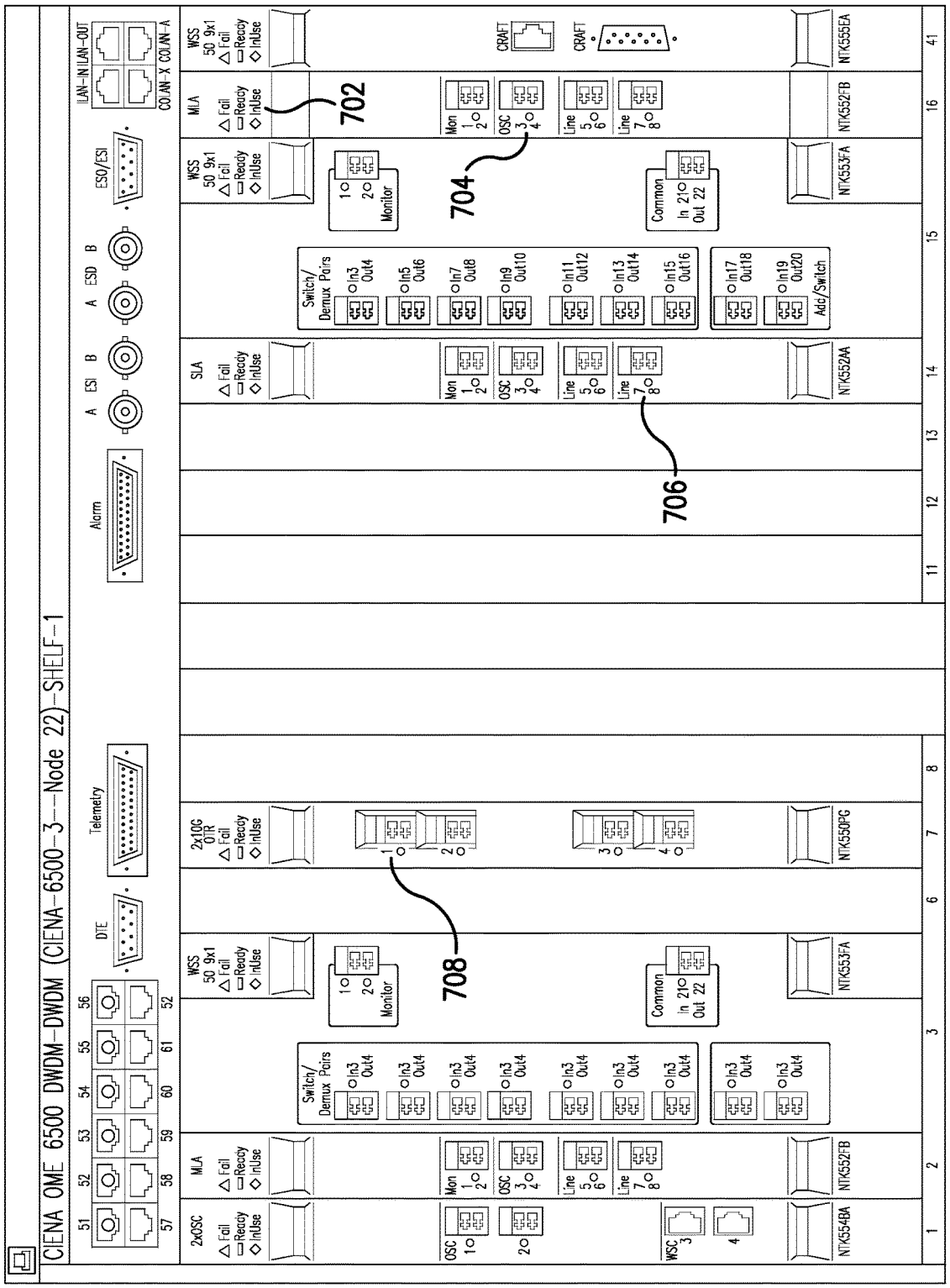
FIG. 7 shows an example of the discovered physical inventory of an OTN node and the interfaces for monitoring performance of an optical transport network, according to an embodiment.
Figure 8:
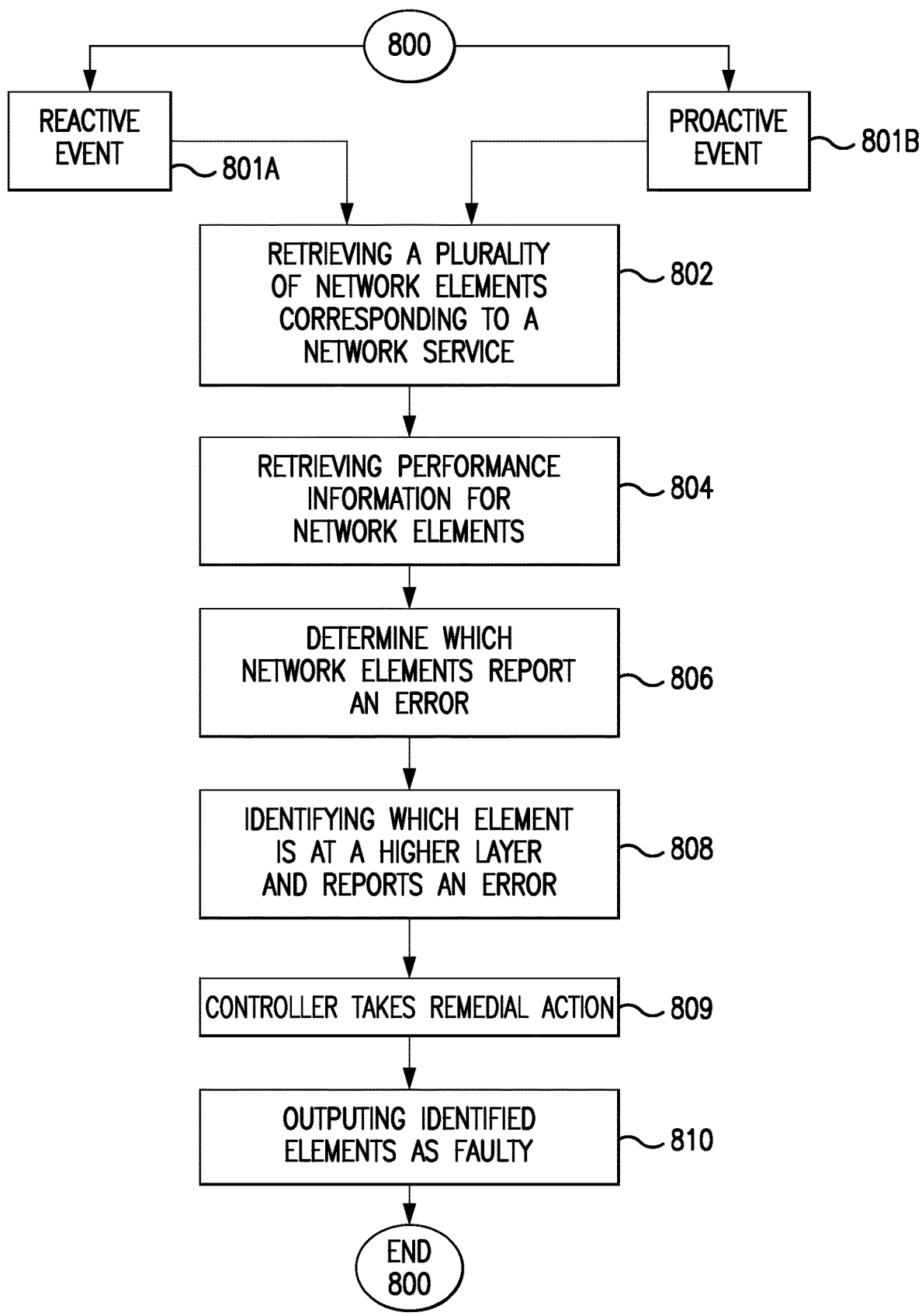
FIG. 8 shows a method for isolating an error in an optical transport network, according to an embodiment.

When the user defined rule is met, method 800 in FIG. 8 may be triggered to retrieve runtime performance data from the entire end-to-end circuit and to locate a fault. Based on that data, a remedial action is triggered at step 408. The remedial action may involve alerting, ticketing, or auto remediation. Alerting may involve sending a notification message to an individual responsible for the network. Alerting may also involve providing information on a customer portal interface, such as the interfaces illustrated in FIGS. 6 and 7. Ticketing may involve creating a trouble ticket for IT personnel to handle. The trouble ticket may be with personnel at a customer site and/or with a vendor who provided the factory built network. Auto remediation may involve steps that attempt to solve the issue. This could involve ordering more equipment, or licenses to extract more capabilities out of existing equipment, to solve a bandwidth problem for example. It could involve execution of a script on the ONE that attempts to troubleshoot the issue, such as by switching the service to its protection card/path or restarting the port or the network element. The auto remediation could evolve isolation of the problem as will be discussed below with respect to FIG. 8.

Figure 5:
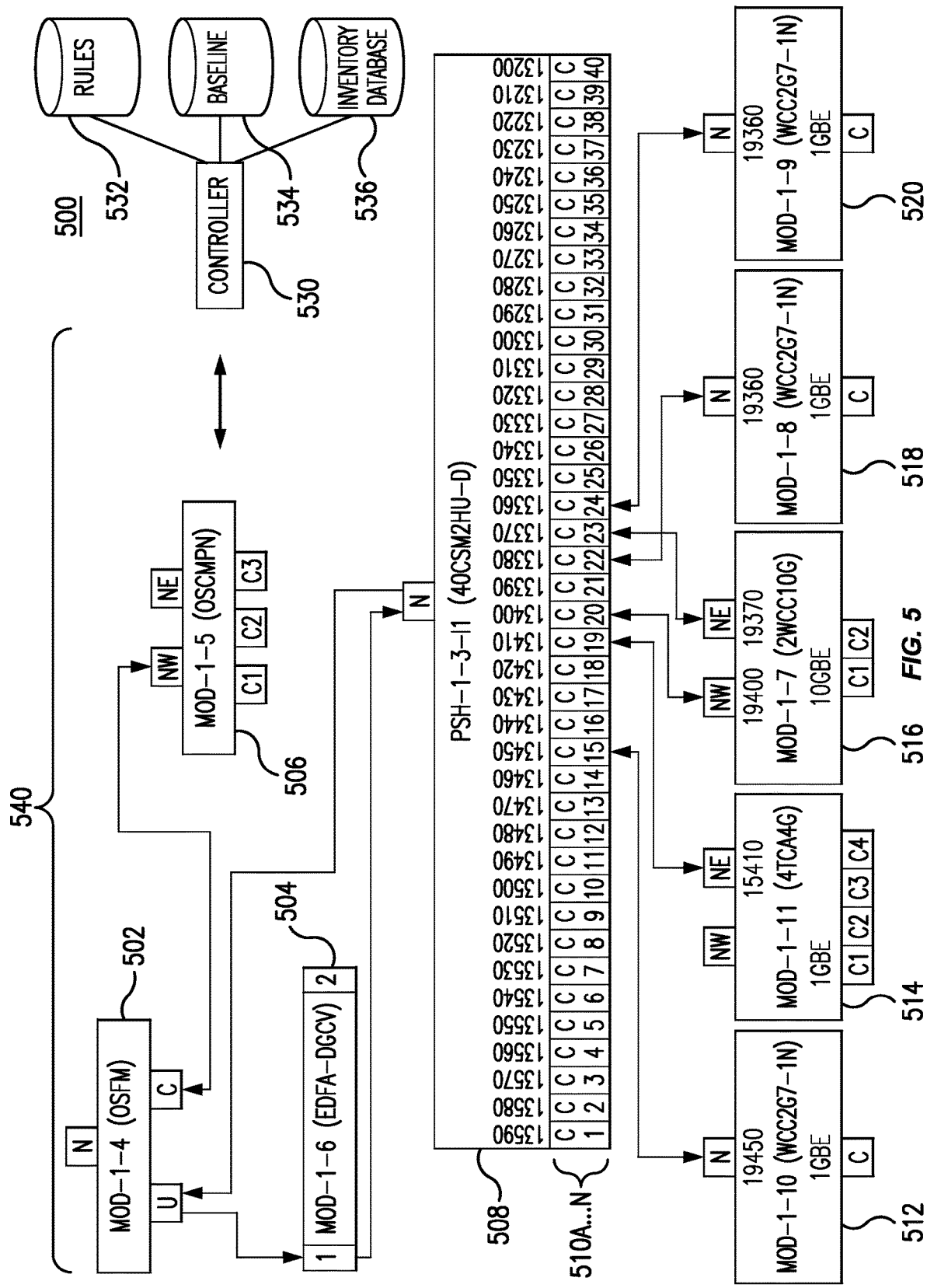
FIG. 5 shows an example of an inventory discovered from an OTN network element and how various cards can be connected together, according to an embodiment.

FIG. 5 shows a system 500 for monitoring performance of an optical transport network, according to an embodiment. System 500 includes an example of one optical transport network element shelf 540 connected to a controller 530, which is coupled to various databases: rules database 532, performance baseline 534, and inventory database 536.

Optical transport network element shelf 540 includes a plurality of optical hardware connected by fiber patch cords. The plurality of optical hardware includes:

Optical supervisory channel modules 502 and 504, which enhance optical layer functionality with out-of-band signaling in a communications and control channel. Optical supervisory channel modules 502 and 504 may provide remote site alarm reporting, communication necessary for fault location.

Erbium-doped fiber amplifier (EDFA) 504, which is an optical repeater device that is used to boost the intensity of optical signals being carried through a fiber optic communications system.

Multiplexer 508, which takes signals from various channels 510A . . . N and combines them on different wavelengths and a single beam of light.

Optical transponders 512, 514, 516, 518, and 520 send and receive optical signals at particular data rates. They may support 3R operations (reshaping, re-timing and re-generating) at unsupported rates.

Controller 530 may execute the operations described above in method 400. In an embodiment, controller 530 can be implemented in a separate appliance, close to the optical transport network, or in the same data center as the OTN. Controller 530 could also be installed on one or more of the optical network elements. Controller 530 could also be installed on a Data Center Interconnect box. Finally, controller 530 could be installed on a different data center through a secure, cloud-based connection.

Baseline database 534 stores a snapshot of optical network 540's performance on set up, before or soon after it entered operation. As described above, the data in baseline database 534 may be calculated based on specifications of optical network element shelf 540. Alternatively, controller 530 can capture the data in baseline database 534 by querying individual optical network elements on optical network element shelf 540.

Rules database 532 stores user-defined rules specifying what actions should trigger under what conditions. The conditions relate to performance information collected by controller 530 and baseline performance information stored in baseline database 534. The conditions specified under what circumstances an action should occur. That is, the conditions may specify a differential or requisite change between baseline performance information in baseline database 534 and runtime performance information collected by controller 530. In addition, rules database 532 can specify what action should occur when the condition is satisfied. As described above, the remedial action could involve notification, ticketing, or an auto remediate functionality.

Inventory database 536 tracks different customers, their associated network services (e.g., VLAN, Ethernet, Internet, etc.), and the optical network elements used to provide the network services. When a new service is added to the inventory database, a provisioning server may push configuration messages to optical network elements in the inventory database. When an existing service is modified, for example, to change a service level, the provisioning server may look to the inventory database to determine which optical network elements to send messages to. In this way, a central provisioning server and inventory database may determine which optical network elements need to be configured.

Figure 6:
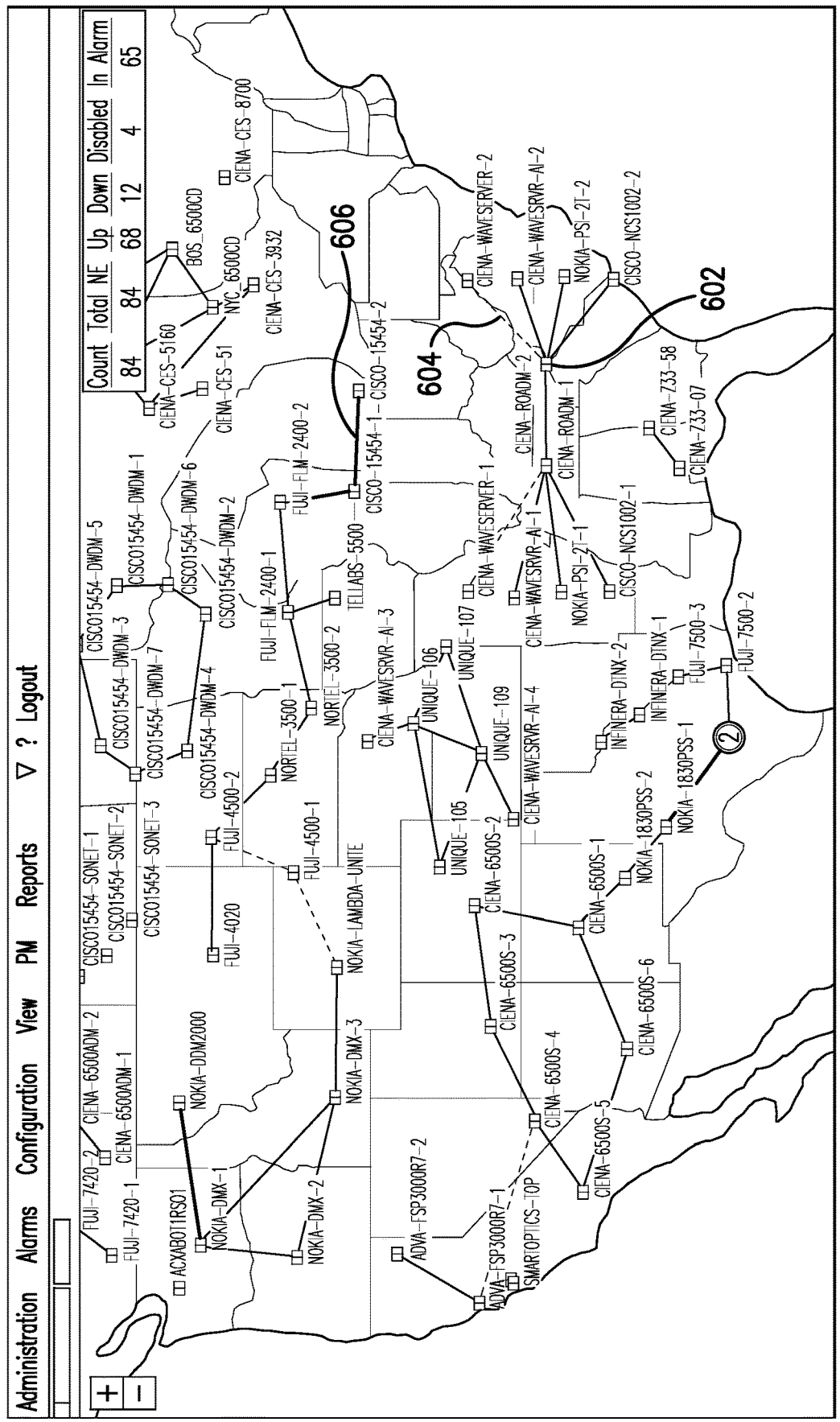
FIG. 6 shows multiple optical transport networks, legacy and next-generation, monitored by a controller, according to an embodiment.

FIG. 6 shows interface 600 with a geographic map showing a plurality of optical chassis in different data centers throughout the country.

Each point, such as point 602, represents a data center that can have one or more optical network chassis, with one or more optical network elements installed thereon. Connecting the optical network elements within a chassis are patch cords. Additional optical network services can be provisioned from interconnecting fibers between data centers. Interface 600 illustrates when particular conditions are met. For example, links between the data centers may change colors indicating potential problems with light levels or other collective performance characteristics.

FIG. 7 shows interface 700 illustrating various optical network elements within an optical network chassis. The various optical network elements are represented by graphics with ports and colored indications 704, 706, and 708 indicating whether an issue is detected. For example, the colored indicators may indicate whether particular user-defined conditions are met indicating a deviation from a performance baseline (e.g. reduced light levels).

FIG. 8 shows a method 800 for isolating an error in an optical transport network, according to an embodiment.

Method 800 begins 801 where either a reactive event begins the process or a proactive event. Reactive events (801A) are user-defined OTN alarms that have been identified as a problem that needs automated trouble isolation. Proactive events (801B) are user-defined OTN performance degradations that have been identified as a problem that needs automated trouble isolation. As described above, the user may define that when a performance characteristic, such as light levels, bit error rate (BER), throughput, latency, errored seconds, severely errored seconds, unavailable second, number of coding violations (errors), forward error corrections, uncorrectable block errors, and/or jitter testing, passes a threshold, an alarm should trigger or performance degradations have occurred that needs automated trouble isolation. Once the event has been identified, it moves to step 802.

At step 802, when a plurality of network elements in the optical transport network that correspond to a network service are identified. The plurality of network elements may be identified by retrieving them from an inventory database, such as inventory database 536 in FIG. 5. Each of the plurality of network elements corresponds to a layer in a network hierarchy of the plurality of network elements.

At step 804, performance information is retrieved for each of the plurality of network elements. The performance information may be retrieved by sending queries to the optical network elements identified in step 802. As described above with respect to FIG. 4, to communicate with the optical network elements, different command sets may be used depending on a type of the network element. The different command sets may be implemented in different resource adapters. Each resource adapter is configured to implement the desire functionality of the controller in one of various network command languages. The network command languages include Transaction Language 1 (TL1), Simple Network Management Protocol (SNMP), command-line interface (CLI), and NETCONF/YANG. In this way, performance information can be retrieved for each of the plurality of network elements.

Figure 9:
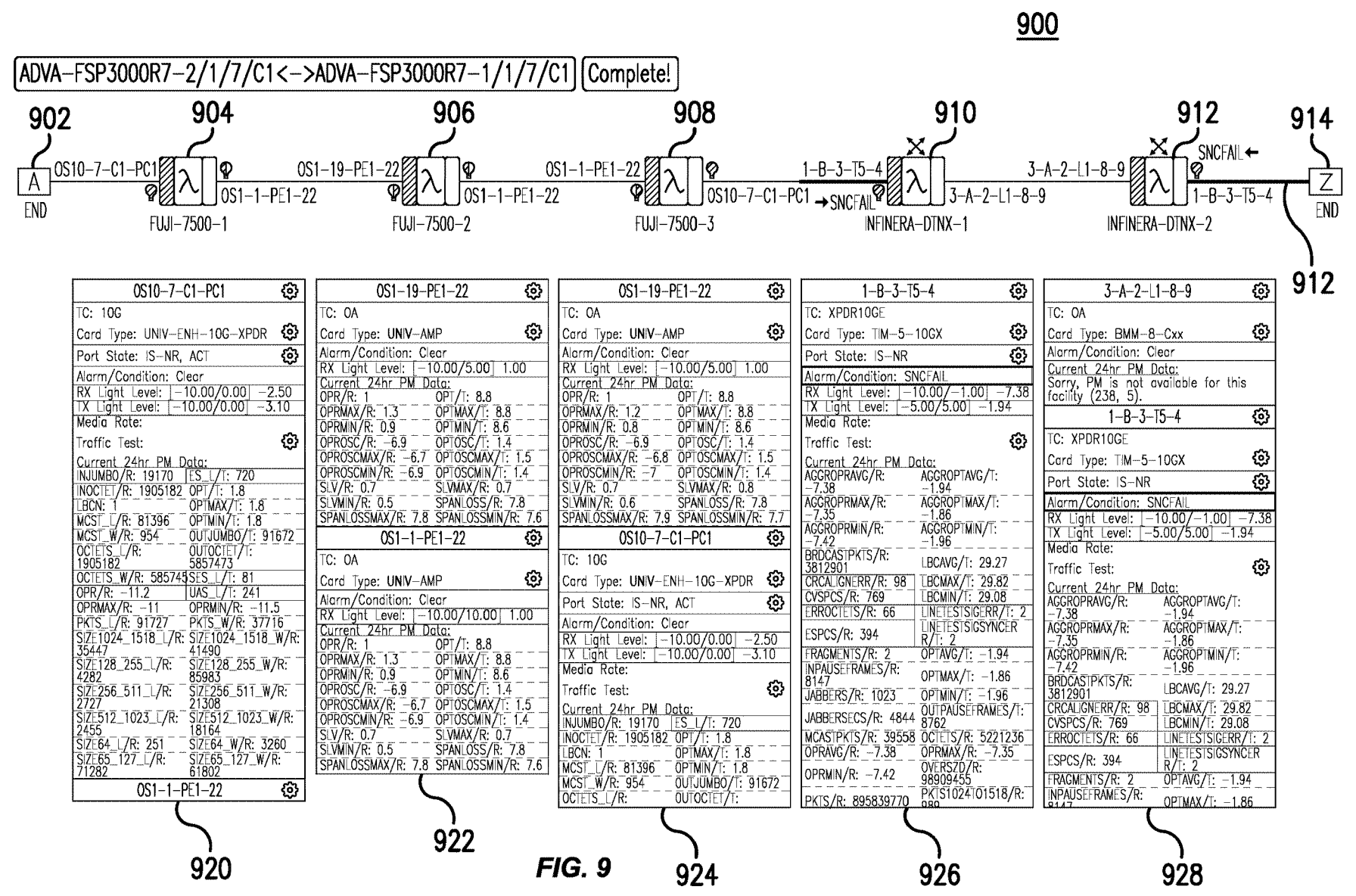

In one embodiment, the performance information may be displayed to the user as illustrated in an interface 900 in FIG. 9. FIG. 9 shows interface 900 of a circuit analysis tool that reports to the user the optical network elements provided for a particular network service and the performance information retrieved for the optical network elements. As shown in interface 900, the circuit has an A-end 902 and a Z-end 914. Between A-end 902 and a Z-end 914, are optical network elements 904, 906, 908, 910, 912, in that order. For each of optical network elements 904, 906, 908, 910, 912, interface 900 shows a respective panel 920, 922, 924, 926, and 928. Each of the respective panels 920, 922, 924, 926, and 928 display collected performance information relating to the relevant port used by the optical network element to provide the requested network service. As shown at, for example, 914, interface 900 may indicate with a special color other indication when a signal failure or error exists (e.g., light levels are below thresholds defined by user-defined rules). This is reflected in step 806 in FIG. 8.

Returning to FIG. 8, at step 806 the retrieved performance information is evaluated determining which network elements from the plurality of network elements report an error in the retrieved performance information. To determine whether an error condition occurs, the retrieved performance information may be compared against a performance baseline and a user-defined rule as described above with respect to FIG. 4. Based on that comparison, the retrieved performance information may be determined to be outside of the normal range, such as a light level that is too low. Using this determination, errors are checked and evaluated along each port utilized in the network service.

At step 808, the error information is used in identifying which network element of the plurality of network elements likely has failed. To determine which network element in the plurality of network elements has failed, a controller may determine which the network element is at a lowest layer in an optical network hierarchy that still reports an error. Beyond that layer, the next lower level layer in the network hierarchy may not report an error on other channels. This is illustrated with respect to FIG. 10.

Figure 10:
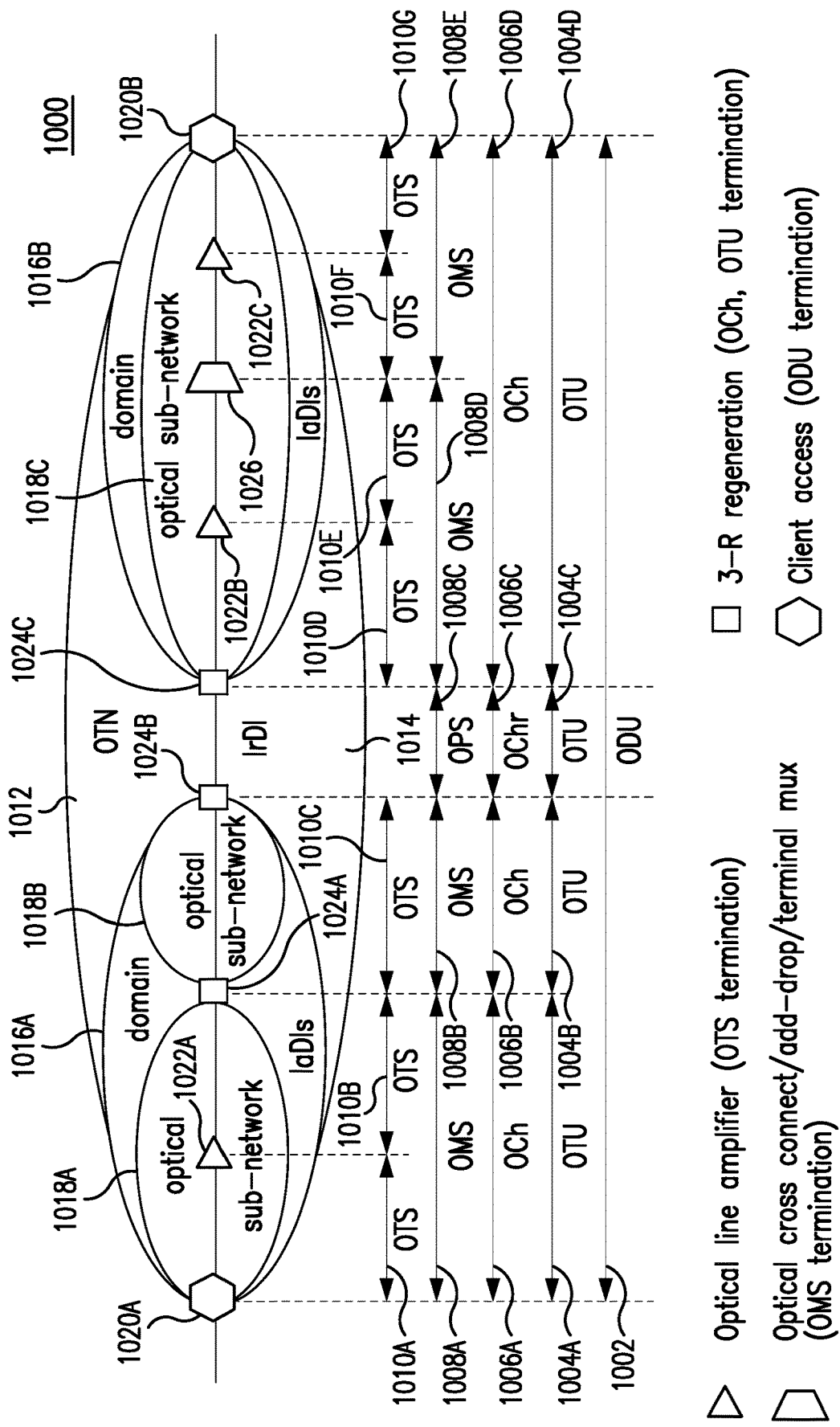
FIG. 10 shows various layers of an optical transport network, according to an embodiment.

While optical transport networks operated a physical layer, optical transport networks may have various sublayers as illustrated in FIG. 10. FIG. 10 shows various layers of an optical transport network, according to an embodiment.

FIG. 10 shows a diagram 1000 with an optical transport network 1012 that connects client access points 1020A and 1020B.

Optical transport network 1012 is divided into different sublayer spanning different devices. As the check occurs in step 808, the sublayers are repeatedly evaluated until the lowest layer in the network hierarchy does not report an error is identified. This may involve repeatedly incrementing a checked layer from a starting layer in the network hierarchy and checking the checked layer to identify if another channel in the checked layer reports an error. A specific example is described below.

First, at a highest layer, an Optical channel Data Unit (ODU) 1002 contains the payload from the network service plus overhead such as bit-interleaved parity 8 (BIP8), general communication channel (GCC) was defined by G.709, and or Tandem Connection Monitoring (TCM) for error correction and management. Optical channel Data Unit 1002 carries the payload from the network service from client endpoint 1020A to client endpoint 1020B, and vice versa.

At a next highest level, Optical Transport Units (OTU) 1004A-D contains the ODU, provides the parity bits such as BIP8, and supports GCC bytes for overhead communication between network nodes. The GCC bytes provide management functions such as performance monitoring, fault detection, and signaling and maintenance commands in support of protection switching, fault sectionalization, service-level reporting, and control plane communications. Each of OTU 1004A-D may correspond to an optical subnetwork or Interdomain interface (IrDI). OTU 1004A spans optical subnetwork 1018A; OTU 1004B spans optical subnetwork 1018B; OTU 1004D spans inter-domain interface 1014; OTU 1004D spans optical subnetwork 1018C.

OTU 1004A-D may contain data from multiple ODUs in addition to ODU 1002.

If the various OTU network elements report an error on only ODU 1002 and not the other ODUs within OTU 1004A-D, then the failed devices can be isolated to the client access terminals 1020A-B. Otherwise, if any one of OTU1004A-D contains errors for all the ODUs it contains, the analysis may continue to the next lower sublayer in the network hierarchy.

The next lower layer in the network hierarchy is an Optical Channel (OCH) that always contains a single OTU. The OTU is mapped into a wavelength of the OCH, which runs across the optical line. OTU 1004A-D correspond to OCH 1006A-D respectively. An OCH always contains at least one OTU. Both span the distance between the various 3R regeneration points 1024A-C and the client access points 1020A-B. So, for the purposes of this analysis, the OTU and OCH analysis may be treated as a common layer.

At a next lower layer, Optical Multiplex Section (OMS) sits between two devices and can multiplex wavelengths onto a fiber. As shown in FIG. 10, OMS 1008A corresponds to OCH 1006A and OTU 1004A, and OMS 1008B corresponds to OCH 1006B and OTU 1004B. A multiplexer 1026 exists on optical subnet 1018C. Thus, OCH 1006D is divided into OMS 1008D and OMS 1008E.

OMS 1008D-E may contain data from multiple OCHs/OMSes in addition to OCH 1006D/OTU1004D. If the various OTU network elements report an error on only OCH 1006D/OTU1004D and not the other OCHs/OMSes within OMS 1008D-E, then the failed devices can be isolated to the client access terminals 1020 B or 3-R regeneration device 1024C. Otherwise, if any one of OMS 1008D-E contains errors for all OCHs/OMSes it contains, the analysis may continue to the next lower sublayer in the network hierarchy.

A next lower sublayer, Optical Transmission Section (OTS) 1010A-G are the fiber between anything that performs an optical function on the signal. An Erbium-Doped Fiber Amplifier (EDFA), such as optical line amplifiers 1022A-C counts as 'line amplifying' equipment. To evaluate OTSs, light levels at each amplifier and optical network element along the path are evaluated to determine where a break in the connection occurs.

Turning to FIG. 8, once the faulty network element is identified at step 808, the identified network element is output as to indicate that it is possibly faulty (or about to be faulty). At step 809, a controller, such as 530 in FIG. 5, may take remedial actions. As described above for step 408, the remedial action may involve alerting, ticketing, or auto remediation. Alerting may involve sending a notification message to an individual responsible for the network. The located problem may be output at step 810. As described above with respect to FIG. 4, this may involve various remediation actions. This can include alerting, ordering equipment, ticketing, or other preprogrammed remediation tasks as specified by a user.

FIGS. 11 and 11A-E show various example operations to isolate a fault in an optical transport network, according to an embodiment.

FIG. 11 illustrates a diagram 1100 with nodes 1102A-D. Each of nodes 1102A-D represents an OTN network elements. Each of nodes 1102A-D includes a respective port 1104A-D. Ports 1104A-D each represent a client signal rate, such as 1GBE, 10GBE, OC192, 100GBE, etc. Port 1104A, on node 1102A, may connect to an A-end of a client service, and Port 1104D, on node 1102D may connect to an Z-end of the client service. Port 1104B, on node 1102B, may connect to an A-end of a client service.

OTU 1106A-D represents interfaces with the OTU signal rate, such as OTU2, OTU3, OTU4, OTUC4, OTUC8, etc. OTU 1106A encapsulates data from port 1104A and transmits to OTU 1106B; OTU 1106B encapsulates data from port 1104B and transmits to OTU 1106A. OTU 1106C encapsulates data from port 1104C and transmits to OTU 1106D; OTU 1106D encapsulates data from port 1104C and transmits to OTU 1106C.

OTS 1108A-D represents interfaces with the OTS signal rate between nodes. OTS 1108A encapsulates data from node 1102A and transmits to OTS 1108B; OTS 1108B encapsulates data from node 1102B and transmits to OTS 1108A. OTS 1108C encapsulates data from node 1102C and transmits to OTS 1108D; OTS 1108D encapsulates data from node 1102D and transmits to OTS 1108C.

FIGS. 11A-E illustrate examples of different faults in the optical transport network of FIG. 11, according to an embodiment. For each, as described above, receive and transmit light levels are checked at each port and line interface in the path of the circuit. Each light level is pass/failed depending on if it is in the acceptable range for that specific hardware or the user-defined specific levels and conditions. When an out of spec receive light level is detected, a controller will identify the port transmitting light towards that receive location and verify if the transmit optical power level is within the acceptable range.

In FIG. 11A, the trouble is isolated between the receive of Port 1104C and the transmit of Port 1104B. This is a one-way issue.

In FIG. 11B, the trouble is isolated to be at the transmit Port 1104B. This is again a one-way issue.

In FIG. 11C, the trouble is isolated to be at the OTUx level at the receive OTUx 1106B location, but not at the OTS level since the aggregate power level is in spec. This is one again a one-way issue.

In FIG. 11D, the trouble is isolated to be between the receive at OTS 1108B and the transmit of OTS 1108A, once again a one-way issue.

In FIG. 11E, the trouble is isolated to be between the receive at OTS 1108A and the receive of OTS 1108B. This is a two-way issue.

A skilled artisan would recognizes that the inventory information, for example shown in in FIGS. 4, 5, 6, and 8, could represent physical inventory, logical inventory, or both. In addition, the performance and fault information and other inputs and outputs described herein can be available via APIs, such as Web Services.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

What is claimed is:

1. A computer implemented method for locating a fault in an optical transport network, comprising:
    (a) retrieving, from an inventory database, a plurality of network elements in the optical transport network corresponding to a network service, wherein each of the plurality of network elements corresponds to a layer in a network hierarchy of the plurality of network elements;
    (b) retrieving performance information for each of the plurality of network elements;
    (c) determining which network elements from the plurality of network elements report an error in the retrieved performance information;
    (d) identifying which network element of the plurality of network elements that report the error in (c) is at a highest layer in the network hierarchy; and
    (e) outputting the network element identified in (d) as being possibly faulty.

2. The method of claim 1, wherein the identifying (d) comprises identifying a lowest layer in the network hierarchy that does not report an error on other channels.

3. The method of claim 2, wherein the identifying (d) comprises repeatedly, until the lowest layer in the network hierarchy that does not report an error is identified,
    incrementing a checked layer from a starting layer in the network hierarchy; and checking the checked layer to identify if another channel in the checked layer reports an error.

4. The method of claim 1, wherein the network hierarchy includes an Optical Data Unit connecting a first and second network element in the plurality of network elements,
   wherein the Optical Data Unit includes a plurality of Optical Transport Units, wherein at least one of the plurality of Optical Transport Units connects a third and fourth network element in the plurality of network elements, wherein the third and fourth network elements are between the first and second network elements,
   wherein the at least one Optical Transport Unit includes a plurality of Optical Transport Segments, wherein at least one of the plurality of Optical Transport Segments connects a fifth and sixth network element in the plurality of network elements, wherein the fifth and sixth network elements are between the third and fourth network elements.

5. The method of claim 4, wherein the determining (c) comprises determining that the at least one Optical Transport Segment has an error,
   wherein the identifying (d) comprises:
   (i) determining whether other Optical Transport Segments in the plurality of Optical Transport Segments report an error;
   (ii) if no other Optical Transport Segments in the plurality of Optical Transport Segments report an error in (i), determining that the fifth and sixth network elements are possibly faulty;
   (iii) otherwise, determining whether other Optical Data Units in the plurality of Optical Data Units report an error; and
   (iv) if no other Optical Data Units in the plurality of Optical Data Units report an error in (iii), determining that the third and fourth network elements are possibly faulty.

6. The method of claim 1, further comprising:
   (f) triggering steps (a)-(e) when a user-specified condition occurs.

7. The method of claim 1, wherein the outputting (e) comprises outputting according to a user-defined condition.

8. The method of claim 7, wherein the outputting (e) comprises selecting from a plurality of notification techniques according to a user-defined condition.

9. The method of claim 1, wherein the outputting (e) includes registering a work ticket identifying the network element identified in (d) as being possibly faulty.

10. A non-transitory computer-readable device having instructions stored thereon that, when executed by at least one computing device, cause the at least one computing device to perform operations for locating a fault in an optical transport network, the operations comprising:
   (a) retrieving, from an inventory database, a plurality of network elements in the optical transport network corresponding to a network service, wherein each of the plurality of network elements corresponds to a layer in a network hierarchy of the plurality of network elements;
   (b) retrieving performance information for each of the plurality of network elements;
   (c) determining which network elements from the plurality of network elements report an error in the retrieved performance information;
   (d) identifying which network element of the plurality of network elements that report the error in (c) is at a highest layer in the network hierarchy; and
   (e) outputting the network element identified in (d) as being possibly faulty.

11. The non-transitory computer-readable device of claim 10, wherein the identifying (d) comprises identifying a lowest layer in the network hierarchy that does not report an error on other channels.

12. The non-transitory computer-readable device of claim 11, wherein the identifying (d) comprises repeatedly, until the lowest layer in the network hierarchy that does not report an error is identified,
   incrementing a checked layer from a starting layer in the network hierarchy; and
   checking the checked layer to identify if another channel in the checked layer reports an error.

13. The non-transitory computer-readable device of claim 10, wherein the network hierarchy includes an Optical Data Unit connecting a first and second network element in the plurality of network elements,
   wherein the Optical Data Unit includes a plurality of Optical Transport Units, wherein at least one of the plurality of Optical Transport Units connects a third and fourth network element in the plurality of network elements, wherein the third and fourth network elements are between the first and second network elements,
   wherein the at least one Optical Transport Unit includes a plurality of Optical Transport Segments, wherein at least one of the plurality of Optical Transport Segments connects a fifth and sixth network element in the plurality of network elements, wherein the fifth and sixth network elements are between the third and fourth network elements.

14. The non-transitory computer-readable device of claim 13, wherein the determining (c) comprises determining that the at least one Optical Transport Segment has an error,
   wherein the identifying (d) comprises:
   (i) determining whether other Optical Transport Segments in the plurality of Optical Transport Segments report an error;
   (ii) if no other Optical Transport Segments in the plurality of Optical Transport Segments report an error in (i), determining that the fifth and sixth network elements are possibly faulty;
   (iii) otherwise, determining whether other Optical Data Units in the plurality of Optical Data Units report an error; and
   (iv) if no other Optical Data Units in the plurality of Optical Data Units report an error in (iii), determining that the third and fourth network elements are possibly faulty.

15. The non-transitory computer-readable device of claim 10, further comprising:
   (f) triggering steps (a)-(e) when a user-specified condition occurs.

16. The non-transitory computer-readable device of claim 10, wherein the outputting (e) comprises outputting according to a user-defined condition.

17. The non-transitory computer-readable device of claim 16, wherein the outputting (e) comprises selecting from a plurality of notification techniques according to a user-defined condition.

18. The non-transitory computer-readable device of claim 10, wherein the outputting (e) includes registering a work ticket identifying the network element identified in (d) as being possibly faulty.

19. A computer implemented method for locating a fault in a physical-layer transport network, comprising:

(a) retrieving, from an inventory database, a plurality of network elements in the transport network corresponding to a network service, wherein each of the plurality of network elements corresponds to a layer in a network hierarchy of the plurality of network elements;
(b) retrieving performance information for each of the plurality of network elements;
(c) determining which network elements from the plurality of network elements report an error in the retrieved performance information;
(d) identifying which network element of the plurality of network elements that report the error in (c) is at a highest layer in the network hierarchy; and
(e) outputting the network element identified in (d) as being possibly faulty.

* * * * *